F. C. METZ.
SELF WEIGHING BALANCE SCALE.
APPLICATION FILED APR. 30, 1915.
1,170,838. Patented Feb. 8, 1916.
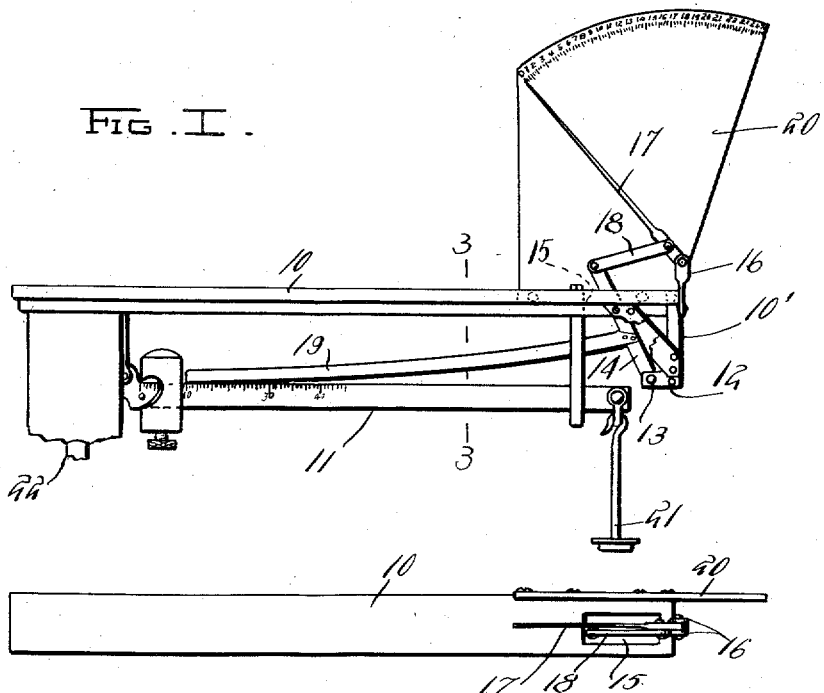
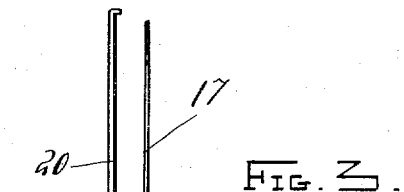
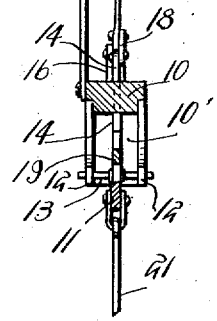
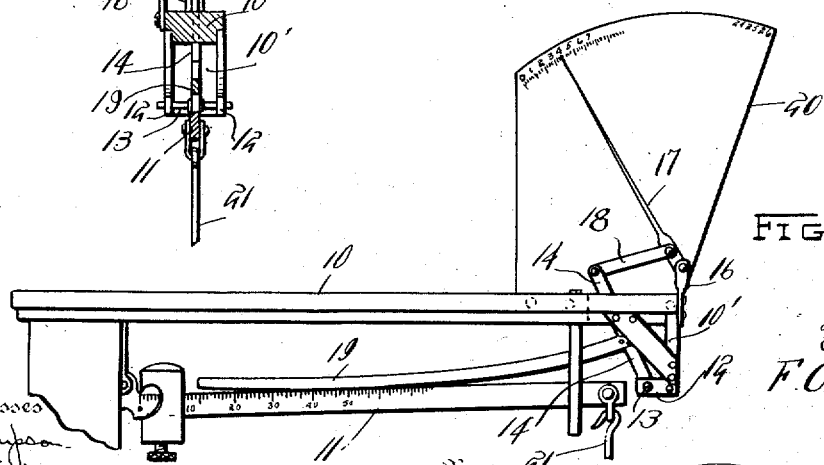
Inventor
F. C. Metz

UNITED STATES PATENT OFFICE.

FREDRICK C. METZ, OF SUCCASUNNA, NEW JERSEY.

SELF-WEIGHING BALANCE-SCALE.

1,170,838.  Specification of Letters Patent.  Patented Feb. 8, 1916.

Application filed April 30, 1915. Serial No. 24,959.

*To all whom it may concern:*

Be it known that I, FREDRICK C. METZ, a citizen of the United States, residing at Succasunna, in the county of Morris, State of New Jersey, have invented certain new and useful Improvements in Self-Weighing Balance-Scales; and I do hereby declare the following to be a full, clear, and exact description of the invention, such as will enable others skilled in the art to which it appertains to make and use the same.

This invention relates to improvements in scales and particularly to attachments for beam or platform scales.

The principal object of the invention is to provide a simple and novel indicating attachment which is automatic in its action to indicate the weights of articles placed on the platform without the use of the ordinary sliding poise.

Another object resides in the peculiar construction and arrangement of the member which engages with the beam of the scale.

Other objects and advantages will be apparent from the following description when taken in connection with the accompanying drawing.

In the drawing: Figure 1 is an elevation of a portion of a platform scale showing my invention applied thereto, Fig. 2 is a top plan view, Fig. 3 is a vertical section on the line 3—3 of Fig. 1, looking toward the right in said figure, Fig. 4 is an elevation showing the scale beam rocked upwardly to illustrate the action on the arcuate member bearing thereon.

Referring particularly to the accompanying drawing, 10 represents the upper framework and 11 the beam of an ordinary platform scales.

Mounted on the vertical portion of the frame-work 10, adjacent the free end of the beam are the brackets 12 which support a rock shaft 13. Secured to this rock shaft, between the brackets, is an arm 14 which extends upwardly through a slot 15 formed in the upper horizontal portion of the frame 10. At the upper end of the said vertical member of the frame, and extending above the upper horizontal member is a bracket 16 in which is pivotally mounted the lower end of an indicating arm or pointer 17.

Pivotally connected at its opposite ends to the upper end of the arm 14 and to the indicator pointer above its pivot is a link 18. Rigidly secured to the lower portion of the arm 14 above its connection with the shaft 13, is an arcuate weighted arm 19, the convex edge of which bears on the upper edge face of the scale beam 11.

Secured to the top of the frame, back of the pointer 17 is a dial 20 over which the pointer is adapted to traverse when moved by the links and arms.

On the free end of the beam 11 is the usual weight supporting device 21. The usual bar 22 is connected to the beam at the rear of its pivotal support and is connected with the platform, not shown.

The weight of the arm 19 is sufficient to hold the pointer at the zero point on the scale dial 20 but when weight is placed on the platform so as to exert pull on the beam 11 to lift its free end, the curved or convexed edge of the arm 19 will be engaged by the beam so that said arm will be rocked, and further, by its connection with the arm 14, the latter will be rocked. The pointer will be moved over the scale dial to accurately indicate the weight of the article on the platform. When the article is removed from the platform, the parts will automatically restore themselves to normal position, that is the position shown in Fig. 1.

From the foregoing it will readily be seen that I have provided a simple device of this character which is readily applicable to any of the ordinary platform scales now in use.

Particular attention is called to the fact that the curvature of the arm 19 is such that said arm will successively touch the beam at different points along its length, so that the same effect is obtained as with the use of the sliding poise weight. It will further be noted that I have dispensed with springs which are liable to stretch out of shape and thus require adjustments.

What is claimed is:

The combination with the frame and beam of a platform scales, of a vertical arm pivotally supported on the frame of the scales, a scale dial mounted on the frame, an indicating pointer pivotally mounted on the frame in position to traverse the scale dial, a link pivotally connecting the said arm with the pointer, and an arcuate weighted bar secured to the said arm and bearing with its convex edge on the upper edge of the scale beam.

In testimony whereof, I affix my signature, in the presence of two witnesses.

FREDRICK C. METZ.

Witnesses:
 JOHN W. FANCHER,
 PETER W. METZ.